United States Patent Office 2,767,192
Patented Oct. 16, 1956

2,767,192
KETONE HYDRAZONES

Hans-Albert Offe, Leverkusen-Wiesdorf, Werner Siefken, Leverkusen, and Gerhard Domagk, Wuppertal-Elberfeld, Germany, assignors to Schenley Industries, Inc., New York, N. Y., a corporation of Delaware No Drawing. Application November 25, 1952,
Serial No. 322,557

Claims priority, application Germany December 22, 1951

4 Claims. (Cl. 260—295)

This invention relates generally to chemical compounds useful in chemotherapy and, more particularly, it is concerned with a certain group of novel condensation products of pyridine carboxylic acid hydrazides and compounds having a reactive keto carbonyl group, useful in the treatment of tuberculosis in domestic animals.

It is known that isonicotinic acid hydrazide is useful in the treatment of tuberculosis in humans and in other animals. In accordance with this invention, it is now found that a group of Schiffs-base type hydrazone compounds, obtained by condensing certain compounds having a reactive keto carbonyl group with a pyridine carboxylic acid hydrazide, are not only useful agents in the treatment of tuberculosis, having a degree of activity comparable to that of isonicotinic acid hydrazide, but have the advantage of being less toxic than that known chemotherapeutic agent. This new group of compounds is also useful against various acid-resistant pathogenic bacteria.

The novel chemotherapeutically useful compounds according to this invention may be represented by the formula:

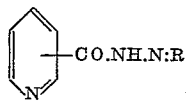

wherein R is a radical chosen from the group consisting of alpha methyl alkylidene, alpha methyl omega carboxy alkylidene, and alpha isonitroso alpha prime methyl alkylidene, comprising at most 5 carbon atoms; monohomocarboxylic aralkylidene wherein the alkylidene moiety comprises at least 2 carbon atoms of which 1 is in a methyl group substituent of the carbon atom linked by the double bond to the terminal nitrogen atom; and monohomocarbocycloalkylidene comprising at most 6 carbon atoms. It will be noticed that, in each of these hydrazone compounds, the carbon atom of the radical R that is linked by the double bond to the nitrogen atom has each of its remaining two valence linkages joined to carbon atoms, in contradistinction to that type of hydrazone compound, obtainable by condensing a hydrazide with an aldehyde instead of a ketone, wherein one of these two valence linkages is joined to a hydrogen atom. This distinction between the two classes of hydrazones is believed to be of significance as regards the relative toxicity of the compounds for it is thought that the molecular scission of the ketohydrazones following administration yields different types of products than are obtained by scission of aldehyde hydrazones.

The novel compounds of this invention may be obtained by reacting the selected pyridine carboxylic acid hydrazide with the selected keto compound, preferably in a solvent medium, such as a lower alkanol. The reaction proceeds smoothly and the desired ketohydrazone of the pyridine carboxylic acid hydrazide, which forms as the reaction product, separates from the alcoholic solution as a crystalline mass which may be recovered by filtration of the reaction mixture. It may be recrystallized from suitable common organic solvents, such as ethanol, methanol, glacial acetic acid or aqueous acetic acid mixtures. An alternative procedure for obtaining the compounds of this invention is to react a suitably selected ketohydrazone with a selected pyridine carboxylic acid or a functional derivative thereof, such as a halide, ester, anhydride or salt. The new compounds of this invention also may be obtained by melting a suitably selected pyridine carboxylic acid hydrazide with a suitably selected keto compound. It is also possible to utilize, in lieu of the keto compound as such, a keto oxime, hydrazone, azine, semicarbazone or other functional derivative.

The reactions for producing the compounds of this invention, generally, proceed best at temperatures somewhat elevated above normal room temperature, preferably at about the boiling point of water and the lower alkanols, but in some instances, the use of higher or lower temperatures may be desirable. In instances where the reaction products are susceptible to oxidation by atmospheric oxygen, it is desirable to effect the reaction for producing the compounds in the presence of an inert atmosphere or in the presence of suitable reducing agents. The reactions normally proceed at a sufficient rate without use of catalysts, but the condensation reaction is facilitated by addition of electrolytes, especially acids, to the reaction mixture. Another modification consists in dissolving the reactants in a solvent immiscible with water, and if desired after addition of catalysts, while continuously removing the water formed in the reaction by azeotropic distillation.

To facilitate a better understanding of the subject matter of this invention, several examples follow, wherein the preparation of specific compounds of the invention is described. It will be understood that these examples are provided by way of illustration merely and are not to be construed as imposing any limitation upon the scope of the invention as defined by the subjoined claims.

*Example 1*

Synthesis of the compound represented by the formula:

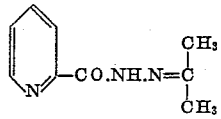

About 4 parts by weight of α-picolinic acid hydrazide are dissolved in methanol at a temperature near its boiling point and reacted with 20 parts by volume of acetone. The solution is carefully concentrated by evaporation of methanol at 20° C., then ether is added causing separation of the crystalline condensation product, the acetone hydrazone of α-picolinic acid hydrazide. After recrystallizing of the separated crude product from a mixture of alcohol and ether, the resulting purified acetone hydrazone of α-picolinic acid hydrazide melts at 101° C.

*Example 2*

Synthesis of the compound represented by the formula:

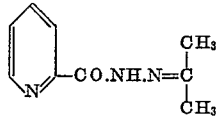

About 15 parts by weight of nicotinic acid hydrazide and 150 parts by volume of acetone are refluxed, a clear solution being formed. Upon cooling, crystallization of the product, the acetone hydrazone of nicotinic acid hydrazide, occurs and the product is separated from the supernatant liquor. After recrystallizing from acetone the purified acetone hydrazone of nicotinic acid hydrazide thus formed melts at 148–150° C.

Example 3

Synthesis of the compound represented by the formula:

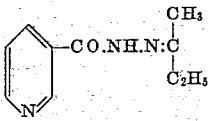

The operations described in Example 2 are repeated excepting that the acetone therein employed is replaced with an equimolecular proportion of methyl ethyl ketone. After cooling the reaction mixture, the product, the methyl ethyl ketone hydrazone of nicotinic acid hydrazide, separates as a crystalline mass which is removed from the supernatant liquor and recrystallized from methyl ethyl ketone. It melts at 78°–84° C.

Example 4

Synthesis of the compound represented by the formula:

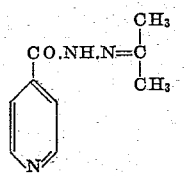

About 5 parts by weight of isonicotinic acid hydrazide, dissolved in 50 parts by volume (about 40 parts by weight) of boiling alcohol, are mixed with an amount in excess of the equimolecular proportion of acetone. The acetone hydrazone of isonicotinic acid hydrazide crystallizes when the solvent is evaporated. Its melting point is 164° C., after recrystallizing from acetone.

Example 5

Synthesis of the compound represented by the formula:

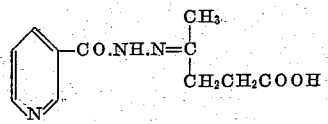

About 69 parts by weight of nicotinic acid hydrazide and 58 parts by weight of levulinic acid are refluxed for a brief period of time in 1000 parts by volume (about 800 parts by weight) of methanol, then the solvent is evaporated to about half the original volume. The product, which separates as a crystalline mass, is the levulinic acid hydrazone of nicotinic acid hydrazide, which melts at 157°–158° C. after being recrystallized from methanol; it dissolves in a dilute soda solution.

Example 6

Synthesis of the compound represented by the formula:

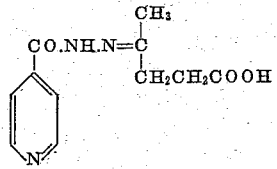

About 69 parts by weight of isonicotinic acid hydrazide, dissolved in 2000 parts by volume of alcohol, are reacted with 58 parts by weight of levulinic acid. The levulinic acid hydrazone of isonicotinic acid hydrazide presently precipitates and is removed. It melts at 224° C. after being recrystallized from methanol. The yield amounts to about 105 parts by weight.

Example 7

Synthesis of the compound represented by the formula:

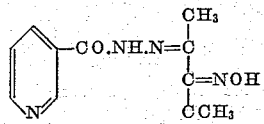

About 137 parts by weight of nicotinic acid hydrazide and 110 parts by weight of diacetylmonoxime are boiled in 400 parts by volume (about 320 parts by weight) of methanol for 20 hours. After some time, crystals begin to precipitate from the initially clear solution. They are removed and washed with methanol and ether after cooling and filtering the solution. The yield amounts to 192 parts by weight. After recrystallization from a mixture of pyridine and methanol, the purified reaction product, the diacetylmonoxime hydrazone of nicotinic acid hydrazide, is obtained. It melts at 213°–214° C.

Example 8

Synthesis of the compound represented by the formula:

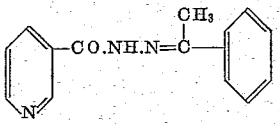

About 69 parts by weight of nicotinic acid hydrazide are dissolved in boiling methanol and refluxed with 60 parts by weight of acetophenone for a prolonged period of time. After removing a portion of the solvent, crystals of the reaction product precipitate which are then removed from the supernatant liquor and recrystallized from methanol. The purified acetophenone hydrazone of nicotinic acid hydrazide so obtained has a melting point of 186°–187° C.

Example 9

Synthesis of the compound represented by the formula:

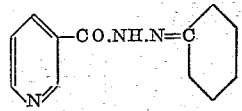

About 137 parts by weight of nicotinic acid hydrazide in 500 parts by volume (about 400 parts by weight) of methanol are refluxed with 56 parts by weight of cyclohexanone for some time. After cooling and removal of the separated crystalline reaction product, it is recrystallized from benzene, yielding the purified cyclohexanone hydrazone of nicotinic acid hydrazide having a melting point of 115° to 116° C.

Example 10

Synthesis of the compound represented by the formula:

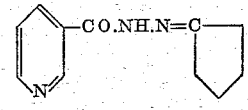

The operations described in Example 9 are repeated excepting that the cyclohexanone is replaced by an equimolecular proportion of cylopentanone. The reaction product so obtained, the cyclopentanone hydrazone of nicotinic acid hydrazide, sinters before melting at 127° C.

Example 11

Synthesis of the compound represented by the formula:

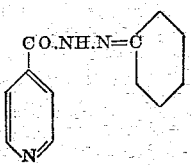

About 137 parts by weight of isonicotinic acid hydrazide are introduced, with stirring, into 400 parts by volume (about 375 parts by weight) of cyclohexanone, the temperature rising thereby to about 50° C. After addition of 150 parts by volume (about 135 parts by weight) of benzene, the mixture is refluxed and the water simultaneously formed in the production of the hydrazone reaction product (about 17.5 parts by volume) is removed with benzene by azeotropic distillation. The resultant cyclohexanone hydrazone of isonicotinic acid hydrazide, which precipitates as white crystals, is removed, washed with benezene and dried. About 206 parts by weight of the reaction product, melting at 169°-170° C., are obtained.

*Example 12*

Synthesis of the compound represented by the formula:

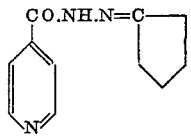

The operations described in Example 11 are repeated excepting that the cyclohexanone is replaced by an equimolecular proportion of cyclopentanone. The reaction product so obtained, the cyclopentanone hydrazone of isonicotinic acid hydrazide, melts at 181°–182° C.

*Example 13*

Synthesis of the compound represented by the formula:

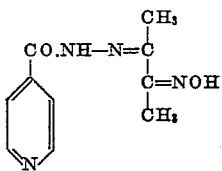

The operations of Example 7 are repeated excepting that the nicotinic acid hydrazide is replaced by isonicotinic acid hydrazide. The reaction product is obtained in a good yield. It has a melting point of 258° to 260° C.

*Example 14*

Synthesis of the compound represented by the formula:

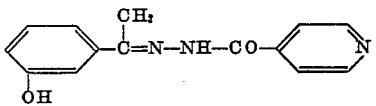

68 parts by weight of m-hydroxyacetophenone and 67 parts by weight of isonicotinic acid hydrazide are suspended in 650 parts by volume of toluene and heated while stirring. The water formed during the formation of the hydrazone is continuously removed by azeotropic distillation. After about 3 hours 8.5 parts by volume of water have collected and the formation of the hydrazone is finished. After cooling the weakly yellow hydrazone is filtered by suction, washed with methanol and dried. The melting point is 228-230° C.

*Example 15*

Synthesis of the compound represented by the formula:

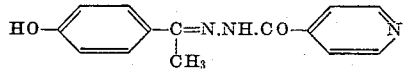

The operations described in Example 14 are repeated with the exception that, instead of m-hydroxyacetophenone, p-hydroxyacetophenone is employed. The final hydrazone of the above formula has the melting point of 276° C.

*Example 16*

If in the foregoing Example 14 the m-hydroxyacetophenone is replaced by o-p-dihydroxyacetophenone a hydrazone of isonicotinic acid hydrazide is obtained which has a melting point of from 270–272° C. with decomposition. The identical process, repeated with m-p-dihydroxyacetophenone yields the 3,4-dihydroxyacetophenone isonicotinic acid hydrazone with a melting point of 255–256° C. with decomposition.

We claim:

1. As new chemotherapeutic agents, the compounds represented by the formula:

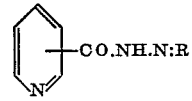

wherein R is a radical comprising at most five (5) carbon atoms and is selected from the group consisting of: alpha methyl omega carboxy alkylidene; and alpha methyl alpha-prime isonitroso alkylidene.

2. A new chemotherapeutic agent represented by the formula:

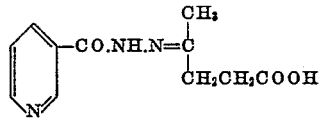

3. The isonicotinyl hydrazone of levulinic acid having the structural formula:

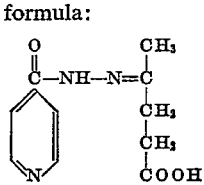

4. A new chemotherapeutic agent represented by the formula:

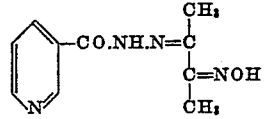

References Cited in the file of this patent

UNITED STATES PATENTS 2,703,322    Fox _____ Mar. 1, 1955

OTHER REFERENCES

Meyer: Monatshefte für Chemie, vol. 33 (1912), pp. 393–414.